US012597248B2

(12) United States Patent　　　　　(10) Patent No.:　US 12,597,248 B2
Tanaka　　　　　　　　　　　　　　(45) Date of Patent:　　　　Apr. 7, 2026

(54) TARGET OBJECT DETECTION DEVICE

(71) Applicant: Shimadzu Corporation, Kyoto (JP)

(72) Inventor: Masato Tanaka, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 325 days.

(21) Appl. No.: 17/898,078

(22) Filed: Aug. 29, 2022

(65) Prior Publication Data

US 2023/0079528 A1　　Mar. 16, 2023

(30) Foreign Application Priority Data

Sep. 14, 2021　(JP) ................................. 2021-149390

(51) Int. Cl.
G06V 20/17　　　(2022.01)
G06T 7/10　　　(2017.01)
(52) U.S. Cl.
CPC ................ G06V 20/17 (2022.01); G06T 7/10 (2017.01); *G06T 2207/10032* (2013.01); *G06T 2207/20081* (2013.01); *G06V 2201/07* (2022.01)
(58) Field of Classification Search
CPC .... G06V 20/17; G06V 2201/07; G06V 20/13; G06V 10/82; G06T 7/10; G06T 2207/10032; G06T 2207/20081
See application file for complete search history.

(56) References Cited

U.S. PATENT DOCUMENTS

| | | | |
|---|---|---|---|
| 11,106,912 B1* | 8/2021 | Zankl | G06V 20/10 |
| 2012/0257086 A1* | 10/2012 | Nakasugi | G06T 3/4038 |
| | | | 348/E5.053 |
| 2016/0344981 A1* | 11/2016 | Lunt | H04N 23/69 |
| 2016/0381282 A1* | 12/2016 | Bandlamudi | H04N 23/69 |
| | | | 348/240.3 |
| 2018/0157911 A1 | 6/2018 | Lo et al. | |
| 2019/0065907 A1* | 2/2019 | Strong | G06N 3/045 |

(Continued)

FOREIGN PATENT DOCUMENTS

| | | |
|---|---|---|
| JP | 2020144922 A | 9/2020 |
| WO | 2020014680 A1 | 1/2020 |

(Continued)

OTHER PUBLICATIONS

Extended European Search Report for corresponding application EP 22194568.6 dated Jan. 27, 2023.

(Continued)

*Primary Examiner* — Wassim Mahrouka
(74) *Attorney, Agent, or Firm* — Muir Patent Law, PLLC

(57)　　　　　　ABSTRACT

A target object detection device capable of providing an image useful for discovering a target object from an aerial image is provided. A target object detection device for detecting at least one target object from an aerial image is provided with an imaging device, a computer, and a display device. The computer is configured to divide the first aerial image into a plurality of first images, output a confidence score that the target object is included, for each of the plurality of first images, and cause the display device to display a first discrimination image capable of discriminating a degree of the confidence score and a portion of the first aerial image corresponding to the confidence score.

18 Claims, 7 Drawing Sheets

(56) References Cited

U.S. PATENT DOCUMENTS

| | | | |
|---|---|---|---|
| 2019/0311203 A1* | 10/2019 | Shah | .................... G06V 10/82 |
| 2021/0133997 A1 | 5/2021 | Abeywardena | |

FOREIGN PATENT DOCUMENTS

| | | | |
|---|---|---|---|
| WO | 2021/075072 A1 | 4/2021 | |
| WO | 2021/100429 A1 | 5/2021 | |

OTHER PUBLICATIONS

Huang et al., "Real-time multi-camera air surveillance system using a simultaneous estimation, filtering and rejection tracking algorithm", Visual Communication and Image Processing (VCIP), Nov. 6, 2011, pp. 1-4, Industrial Technology Research Institute, Taiwan.
Notice of Reasons for Refusal dated Oct. 1, 2024 for corresponding Japanese Patent Application No. 2021-149390.
Applicant's letter, dated Sep. 12, 2023, in response to the EESR, dated Jan. 27, 2023 (11 pages).
Communication from the European Patent Office, dated Mar. 26, 2025 (7 pages).

* cited by examiner

—— 30
——— 151(153)

⇧ The camera-to-object distance H exceeds the threshold L2 (L1<L2)

—— 30
——— 151(153)

⇩ The camera-to-object distance H is less than the threshold L2 (L1<L2)

—— 30
——— 151(153)

Aerial image                                    151

161
Discrimination image                                    30

153

161

161

TARGET OBJECT DETECTION DEVICE

CROSS-REFERENCE TO RELATED APPLICATIONS

This application claims priority under 35 U.S.C. § 119 to Japanese Patent Application No. 2021-149390 filed on Sep. 14, 2021, the entire disclosure of which is incorporated herein by reference in its entirety.

BACKGROUND OF THE INVENTION

Field of the Invention

The present disclosure relates to a target object detection device for detecting a target object from an aerial image.

Description of the Related Art

A technique is known in which a target object, such as, e.g., a victim, is automatically searched using an aerial image captured from a flying object, such as, e.g., a helicopter and a drone. Japanese Unexamined Patent Application Publication No. 2020-144922 proposes a system for quickly and accurately detecting a target object from an aerial image.

SUMMARY OF THE INVENTION

When using an aerial image, as compared with the case in which an image captured on the ground is used, the target object can be retrieved from a larger region. For this reason, it is possible to reduce the number of times that an image is captured while changing the photographing direction to detect a target object. As a result, the efficiency of detecting the target object can be increased.

However, as the height of the flying object increases when an aerial image is captured, the size of the target object included in the aerial image decreases. Therefore, when the target object is detected using the aerial image as it is, the detection accuracy of the target object may deteriorate, and there is a possibility that an erroneous detection result is outputted from the system.

It is an object of present disclosure to provide a target object detection device capable of providing an image useful for discovering a target object from an aerial image.

A target object detection device according to the present disclosure is a target object detection device for detecting at least one target object from an aerial image. The target object detection device is provided with an imaging device, a computer, and a display device. The computer is configured to divide the first aerial image into a plurality of first images, calculate a confidence score that the target object is included for each of the plurality of first images, and cause the display device to display a first discrimination image capable of discriminating a degree of the confidence score and a portion of the first aerial image corresponding to the confidence score.

The above-described objects and other objects, features, aspects, and advantages of the present invention will become apparent from the following detailed descriptions of the present invention that can be understood with reference to the attached drawings.

BRIEF DESCRIPTION OF THE DRAWINGS

The preferred embodiments of the present invention are shown by way of example, and not limitation, in the accompanying figures.

DETAILED DESCRIPTION OF THE PREFERRED EMBODIMENTS

Figure 1:
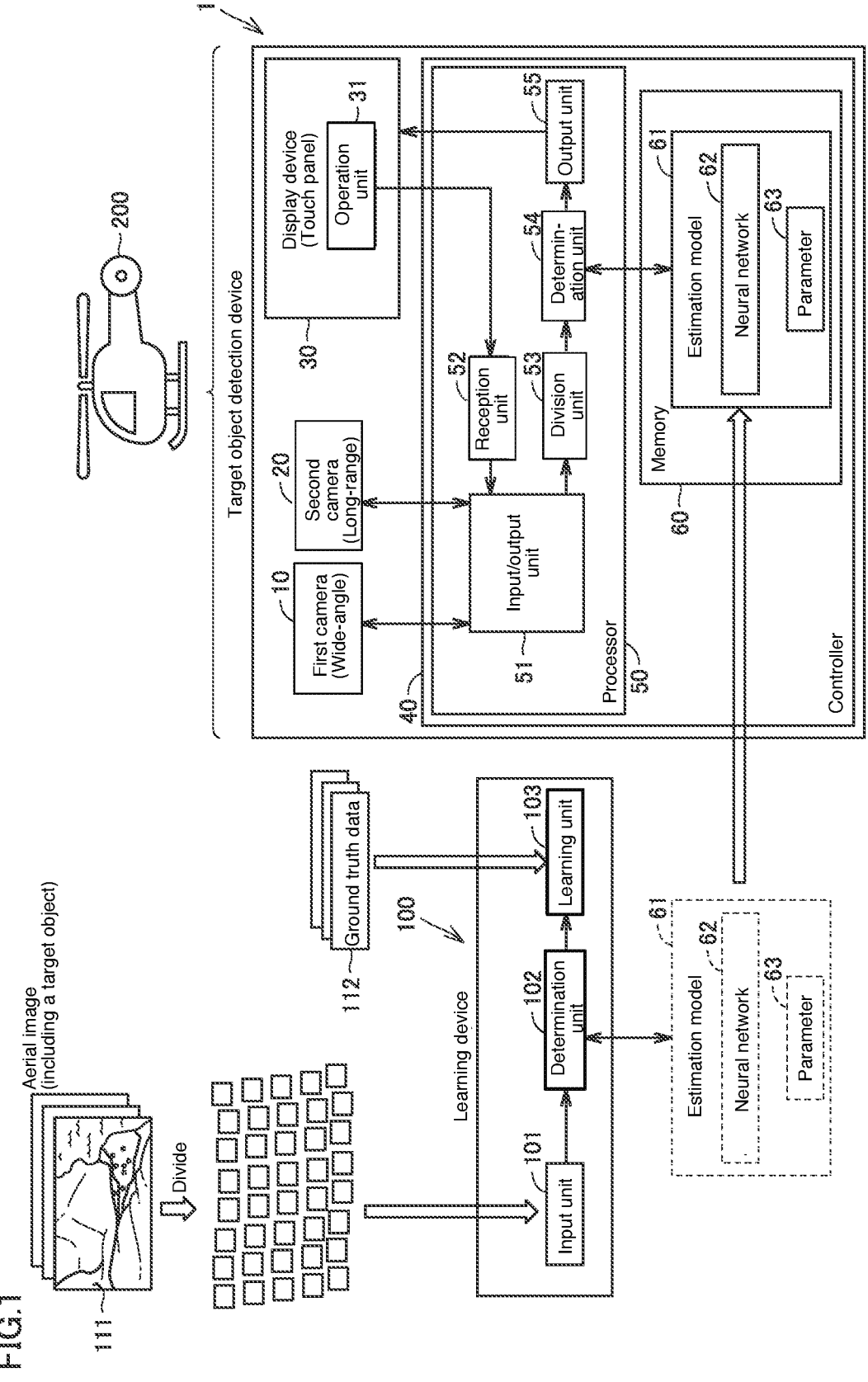
FIG. 1 is a block diagram showing a schematic configuration of a target object detection device according to one embodiment of the present invention.

Hereinafter, some embodiments of the present disclosure will be described in detail with reference to the attached drawings. In the drawings, the same or corresponding component is denoted by the same reference numeral, and the description thereof will not be repeated.

FIG. 1 is a block diagram showing a schematic configuration of a target object detection device 1. The target object detection device 1 is mounted on an aircraft, such as, e.g., a helicopter 200. The target object detection device 1 may be mounted on a drone. The target object detection device 1 is provided with a first camera 10, a second camera 20, a display device 30, and a controller (computer) 40.

The first camera 10 is configured by a wide-angle camera. The second camera 20 is configured by a long-range (telephoto) camera. The first camera 10 and the second camera 20 capture an aerial image in front of the helicopter 200. The first camera 10 and the second camera 20 may be configured by a thermal camera.

The display device 30 is configured by, for example, a liquid crystal display, a plasma display, an organic EL (Electro Luminescence) display or the like. The display device 30 is equipped with a touch panel that functions as an operation unit 31. The display device 30 displays an aerial image captured by the first camera 10 or the second camera 20. Further, the display device 30 displays a discrimination image generated by the controller 40 based on the aerial image. The discrimination image is used to discover at least one target object, such as, e.g., a victim from the aerial image.

The controller 40 is connected to the first camera 10, the second camera 20, and the display device 30. The controller 40 acquires the aerial image from the first camera 10 and the second camera 20. The controller 40 instructs the imaging direction and the imaging magnification for the first camera 10 and the second camera 20. The controller 40 outputs a video signal to the display device 30. An operation signal outputted from the operation unit 31 of the display device 30 is inputted to the controller 40.

The controller 40 is provided with a processor 50 and a memory 60. The processor 50 is typically an arithmetic processing unit, such as, e.g., a CPU (Central Processing Unit) and an MPU (Multi-Processing Unit). The processor 50 may be configured by a processing circuitry. The processor 50 may be configured by a processing circuitry. The processor 50 performs various processing by reading a program stored in the memory 60 and executing the program.

The memory 60 is realized by a non-volatile memory, such as, e.g., a RAM (Random Access Memory), a ROM (Read Only Memory), and a flash memory. In the memory 60, an estimation model 61 used to detect the target object, such as, e.g., victim, from an aerial image is stored. Further, in the memory 60, in addition to the programs executed by the processor 50, various data required for the controller 40 to control the first camera 10, the second camera 20, and the display device 30 is stored.

Note that the memory 60 is not particularly limited as long as it is capable of non-temporarily recording programs in a format readable by the processor 50. For example, the memory 60 may be a CD-ROM (Compact Disc-Read Only Memory), a DVD-ROM (Digital Versatile Disk-Read Only Memory), a USB (Universal Serial Bus) memory, a memory card, an FD (Flexible Disk), a hard disk, an SSD (Solid State Drive), a magnetic tape, a cassette tape, an MO (Magnetic Optical Disc), an MD (Mini Disc), an IC (Integrated Circuit) card (except a memory card), an optical card, a mask ROM, or an EPROM.

The processor 50 functions as an input/output unit 51, a reception unit 52, a division unit 53, a determination unit 54, and a output unit 55. The input/output unit 51 is connected to the first camera 10 and the second camera 20. This connection may be a wired connection or a wireless connection. An aerial image captured by the first camera 10 and the second camera 20 is inputted to the input/output unit 51. The reception unit 52 receives a command based on the operation of the operation unit 31. The reception unit 52 outputs the command based on the operation of the operation unit 31 via the input/output unit 51 to the first camera 10 or the second camera 20.

The estimation model 61 stored in the memory 60 is a model learned by a learning device 100. The controller 40 stores the estimation model 61 learned by the learning device 100 in a memory 60.

Here, a learning phase for learning the estimation model 61 will be described. The estimation model 61 is learned by the learning device 100. The learning device 100 is provided with an input unit 101, a determination unit 102, and a learning unit 103. The learning device 100 is typically a computer equipped with a processor and a memory.

The estimation model 61 has been learned to detect a target object from an aerial image 111 by the learning device 100.

For example, a supervised learning algorithm is used to train the estimation model 61. The learning device 100 trains the estimation model 61 by supervised learning using a large number of training data. The training data is configured by an aerial image 111 and ground truth data 112 corresponding to the aerial image 111.

The aerial image 111 has been prepared in advance to learn the estimation model 61. In the aerial image 111, for example, a target object to be searched is included. The ground truth data 112 includes a determination result corresponding to the aerial image 111. The ground truth data 112 is, for example, data indicating the position of the target object included in the aerial image 111.

The aerial image 111 is inputted to the input unit 101 of the learning device 100. The designer prepares a plurality of such aerial images 111 in advance. The designer learns the estimation model 61 by inputting the training data to the learning device 100.

The estimation model 61 includes a neural network 62 and a parameter 63 used by the neural network 62. As the neural network 62, a well-known neural network used in image-recognition processing by deep-learning is applied. For example, the neural network 62 may be a convolutional neural network (CNN: Convolution Neural Network), a recursive neural network (recursive neural network) (RNN: Recurrent Neural Network), or an LSTM network (Long Short-Term Memory Network). The estimation model 61 performs deep learning by using the neural network 62. The parameter 63 includes, for example, weighting coefficients used for calculations by the neural network 62.

Instead of inputting a single aerial image 111 as it is, an aerial image 111 divided into a plurality of images in advance is input to the input unit 101. To the input unit 101, an aerial image 111 divided into a matrix of, for example, 5 rows and 8 columns is inputted. Based on the image inputted from the input unit 101 and the estimation model 61 including the neural network 62, the determination unit 102 determines whether or not the aerial image 111 includes the target object for each divided image.

The determination unit 102 may perform various imaging processing, such as, e.g., pre-contrast and edge enhancement, to the aerial image 111 in advance. The determination unit 102 acquires the determination result obtained by the estimation model 61 together with the confidence score of the determination result.

Based on the determination result obtained by the determination unit 102 and the ground truth data corresponding to the aerial image 111 of the determination target, the learning unit 103 causes the estimation model 61 to learn. Specifically, the learning unit 103 adjusts the parameter 63 (e.g., the weighting factor) so that the determination result obtained by the estimation model 61 approaches the ground truth data, thereby allowing the estimation model 61.

Thus, based on the training data including the image obtained by dividing the aerial image 111 and the result that the target object exists in the divided image, the estimation model 61 has been learned to calculate the confidence score that the target object is included in the divided image for each divided image.

The number of divisions for dividing the aerial image 111 can be variously set. The size and shape of the image to be acquired by dividing the aerial image 111 can also be set variously. By inputting the aerial image 111 divided in various manners to the input unit 101, the estimation model 61 can be learned based on the images divided in various manners. Further, when the image is divided in various manners, the portion of the image to be cropped is shifted in various manners. Therefore, the amount of the database for storing the learned result of the image can be increased. As a result, the correct answer rate of the determination result obtained based on the estimation model 61 can be increased.

For example, the estimation model 61 may be learned by using the aerial image 111 divided into a matrix of 2 rows and 8 columns, the aerial image 111 divided into a matrix of 5 rows and 8 columns, and the aerial image 111 divided in a matrix of 5 rows and 16 columns.

The target object detection device 1 stores the estimation model 61 learned by the learning device 100 in the memory 60. The target object detection device 1 may be configured to download the estimation model 61 from the learning device 100 and store the acquired estimation model 61 in the memory 60.

Figure 2:
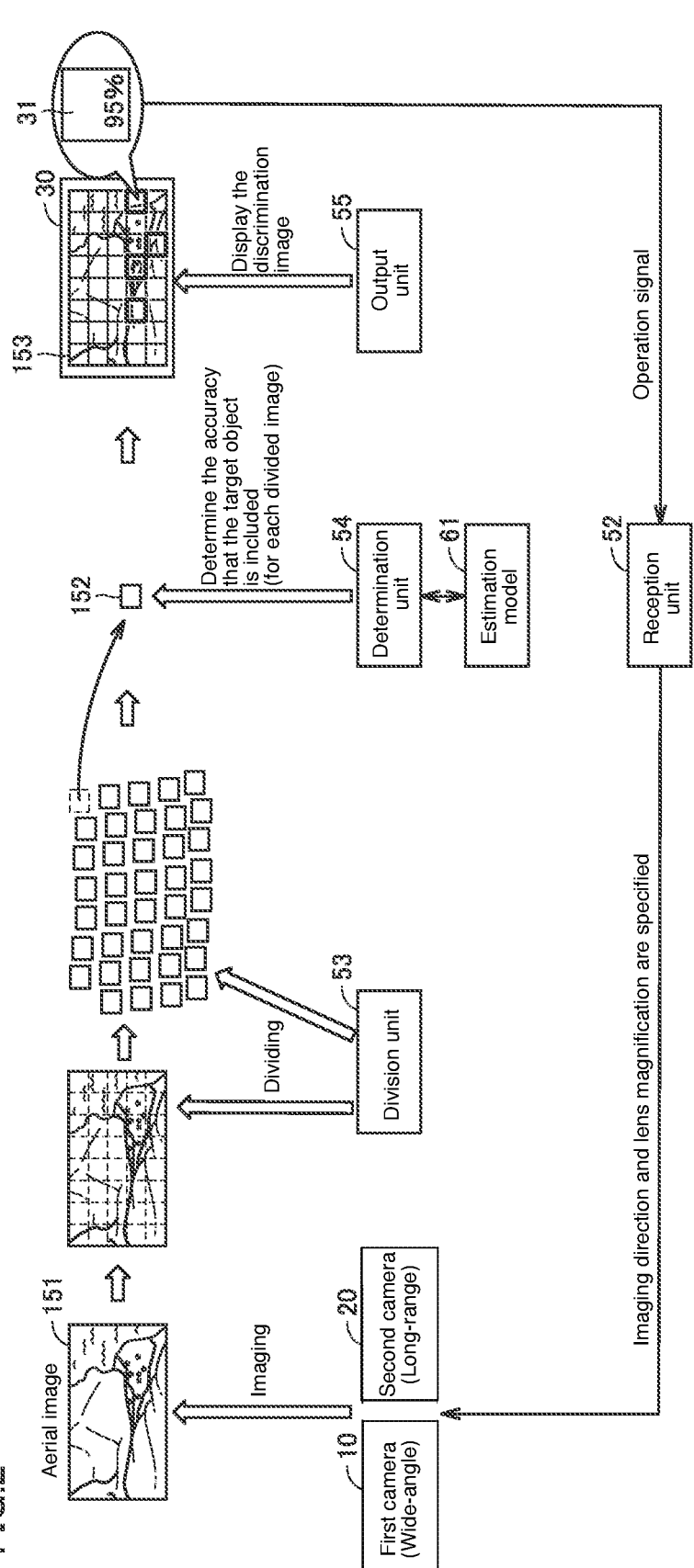
FIG. 2 is a diagram showing an outline of the processing of the target object detection device.

FIG. 2 is a diagram showing an outline of the processing of the target object detection device 1. With reference to FIG. 2, the outline of the processing of the controller 40 of the target object detection device 1 in the operation phase will be described.

The target object detection device 1 mounted on the helicopter 200 or the like captures an aerial image by the first camera 10 and the second camera 20. The first camera 10 and the second camera 20 may output the aerial image 151 captured at the timing of receiving the command from the controller 40 to the controller 40.

For example, it is assumed that the aerial image 151 is captured by the first camera 10 which is a wide-angle camera. In this instance, the division unit 53 divides the aerial image 151 into a plurality of images 152. The determination unit 54 uses the estimation model 61 to determine whether or not the target object is included for each of the divided images 152. This determination result includes the confidence score of the decision.

The output unit 55 generates a discrimination image 153 including the determination results of the determination unit 54 and outputs the discrimination image 153 to the display device 30. The discrimination image 153 includes a plurality of divided images 152 and the frames for partitioning each of the plurality of images 152. Each of the plurality of images 152 included in the discrimination image 153 displays the confidence score that the target object exists. Further, in the discrimination image 153, frames each surrounding the image 152 in which the confidence score exceeds a threshold are depicted with a thick frame. This highlights the image 152 that the confidence score exceeds the threshold.

The searcher searching for the target object can identify the portion that the target object is likely to exist by confirming the confidence score included in the discrimination image 153. In a case where the searcher wants to confirm in more detail the region where there is a high possibility that the target object exists in the discrimination image 153, the searcher touches the portion of the display corresponding to the region with a finger. Then, the operation unit 31 configured by a touch panel detects the operation. The operation unit 31 outputs an operation signal to the reception unit 52.

The reception unit 52 outputs a signal specifying the imaging direction and the lens magnification so that the region of the aerial image 151 specified by the operation signal is largely imaged to the first camera 10 or the second camera 20.

For example, in a case where the discrimination image 153 is an image captured by the first camera 10, the reception unit 52 may output a signal specifying the imaging direction and the lens magnification to the second camera 20.

The first camera 10 or the second camera 20 captures a new aerial image 151 in accordance with a command from the reception unit 52. The division unit 53 divides the newly captured aerial image 151 into a plurality of images. Thereafter, the determination unit 54, the output unit 55, and the reception unit 52 repeat the above-described processing.

As a result, the display device 30 displays a discrimination image 153 in which the region where the target object is likely to exist is enlarged. As a result, searcher becomes easier to find target object.

Figure 3:
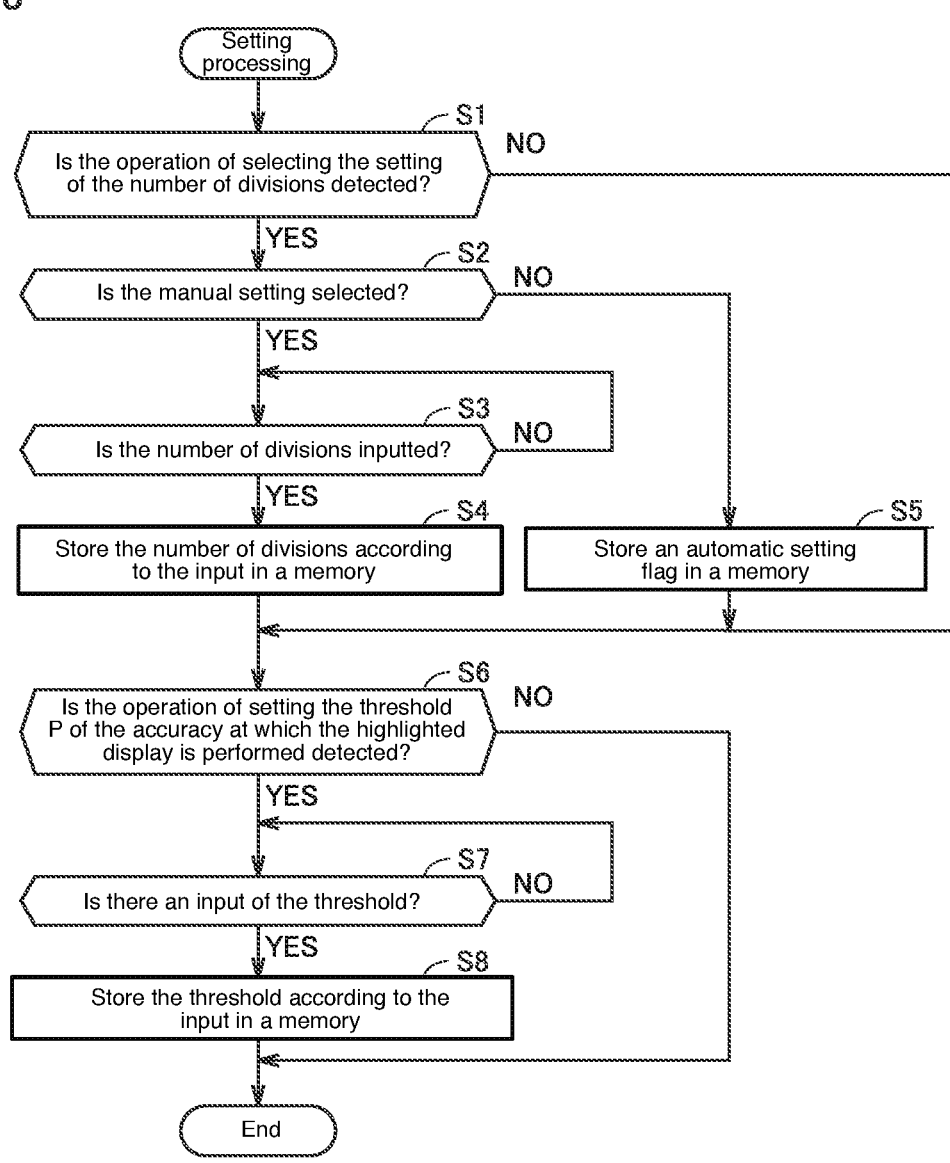
FIG. 3 is a flowchart showing the contents of the setting processing executed by the target object detection device.

FIG. 3 is a flowchart showing the contents of the setting processing performed by the target object detection device 1. The setting processing based on this flowchart is performed by the controller 40 equipped by the target object detection device 1.

First, the controller 40 determines whether or not an operation for selecting the setting of the number of divisions has been detected (Step S1). The target object detection device 1 according to this embodiment is configured to be capable of selecting whether the setting of the number when the aerial image is divided by the division unit 53 is set to the manual setting or the automatic setting.

When the selection of selecting the number of divisions is not detected, the controller 40 advances the processing to Step S6. When the operation of selecting the setting of the number of divisions is detected, the controller 40 determines whether or not the manual setting is selected (Step S2). When the manual setting is selected, the controller 40 waits until the number of divisions is inputted (Step S3). When the number of divisions is inputted, the controller 40 stores the number of divisions according to the input in the memory 60 (Step S4).

When the manual setting is not selected in Step S2 and the automatic setting is selected (NO in Step S2), the controller 40 stores the automatic setting flag in the memory 60 (Step S5). In this instance, the controller 40 automatically determines the number of divisions in response to the camera-to-object distance.

Now, with reference to FIG. 5, the procedures for the controller 40 to determine the number of divisions when the automatic setting flag is set will be described.

Figure 5:
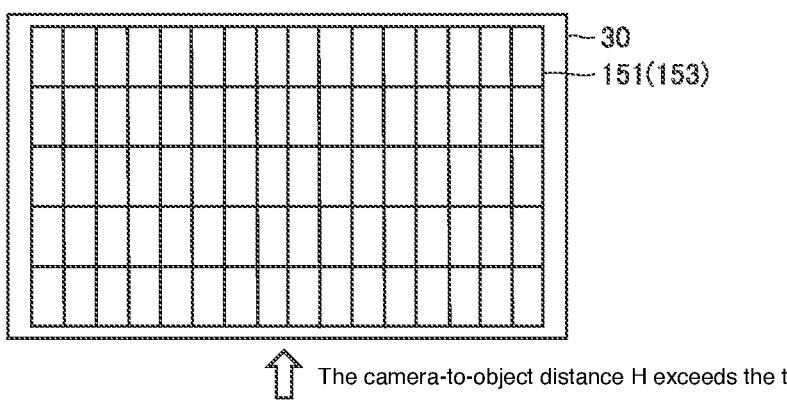
FIG. 5 is a diagram showing an example for setting the number of divisions of an aerial image according to a camera-to-object distance.
Figure 5:
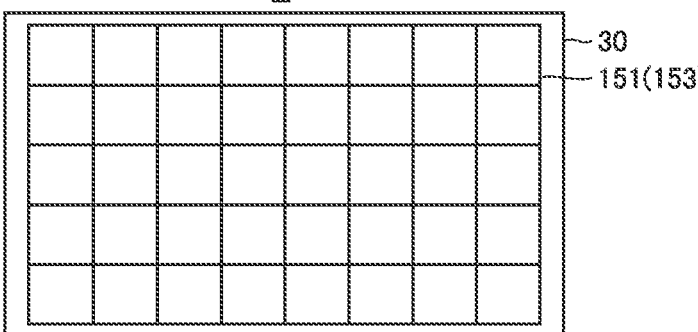
Figure 5:
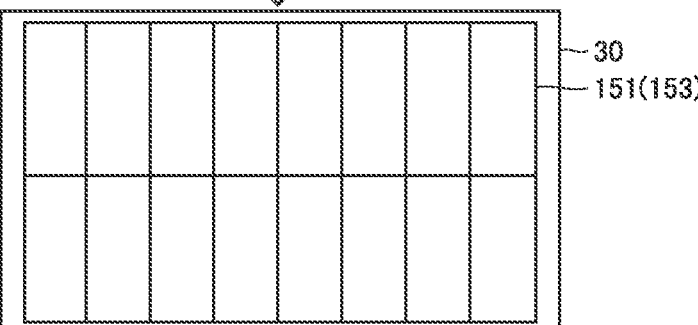

FIG. 5 is a diagram showing an example of setting the number of divisions of an aerial image according to the camera-to-object distance. As shown in FIG. 5, when the setting of the number of divisions is the automatic setting, the controller 40 determines the number of divisions of the aerial image 151 according to the camera-to-object distance when the aerial image 151 is imaged. In the memory 60 of the controller 40, the thresholds L1 and L2 relating to the determination of the number of divisions are stored in advance (L1<L2).

The flight altitude when the aerial image 151 was captured may be adopted as the camera-to-object distance. The distance from the lens to the ground surface when the lens center axis of the first camera 10 or the second camera 20 is extended to the ground surface when the aerial image 151 was imaged may be adopted as the camera-to-object distance. For example, the flight altitude may be identified based on the data of the altimeter equipped by the aircraft carrying the target object detection device 1.

When the camera-to-object distance H satisfies L1 H L2, the controller 40 divides the aerial image 151 into a matrix of five rows and eight columns. When the camera-to-object distance H satisfies H<L1, the controller 40 divides the aerial image into a matrix of two rows and eight columns. When the camera-to-object distance H satisfies L2<H, the controller 40 divides the aerial image 151 into a matrix of five rows and sixteen columns.

As described above, when the camera-to-object distance is long, the number of divisions is set to be larger than when the camera-to-object distance is short, and therefore, when the target object reflected in the aerial image 151 is small, it is possible to search the target object in a finer divided region.

With reference to FIG. 3, the flowchart of the setting processing will be described. In Step S6, the controller 40 determines whether or not the operation for setting the threshold P of the confidence score to be displayed as highlighting has been detected (Step S6). The highlighting means a display in which the portion of an image whose confidence score is higher than the threshold P in the discrimination image 153 shown in FIG. 2 is surrounded by a thick frame. When no action is detected to set the threshold P, the controller 40 terminates the processing. In this situation, the previously inputted value is used as the threshold P.

When the operation of setting the threshold P is set, the controller 40 waits until the threshold P is inputted (Step S7). When the operation of setting the threshold P is detected, the controller 40 stores the threshold P according to the input in the memory 60 (Step S8), and terminates the processing.

As described above, the various operations in the flowchart described above are accepted by, for example, the operation unit 31 of the display device 30.

According to the setting processing based on this flowchart, the setting of the number of divisions can be changed between the manual setting and the automatic setting. According to the manual setting, the searcher can search the target object using the discrimination image divided by the number of divisions as desired. According to the automatic setting, the searcher can search the target object using the discrimination image appropriately divided according to the camera-to-object distance.

Further, according to the setting processing based on this flowchart, the threshold P of the confidence score to be highlighted can be arbitrarily set by the searcher. Therefore, the searcher can set the appropriate threshold P according to the search condition.

Figure 4:
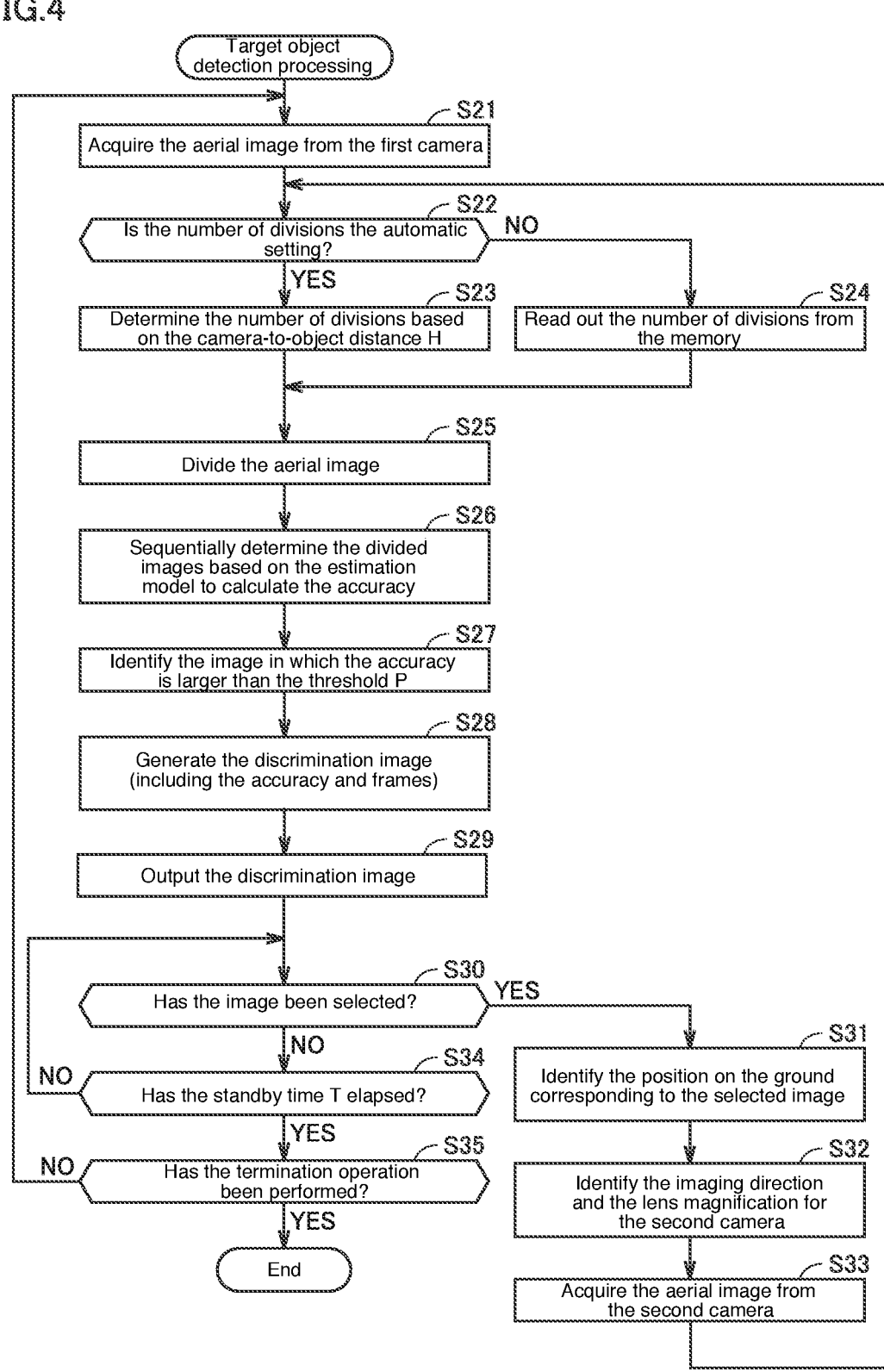
FIG. 4 is a flowchart showing the contents of the target object detecting processing executed by the target object detection device.
Figure 6:
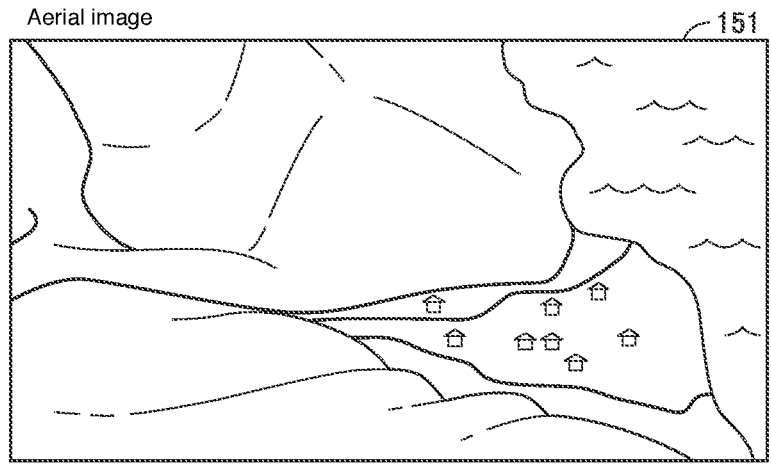
FIG. 6 is a diagram showing an example of an aerial image imaged by the target object detection device.
Figure 7:
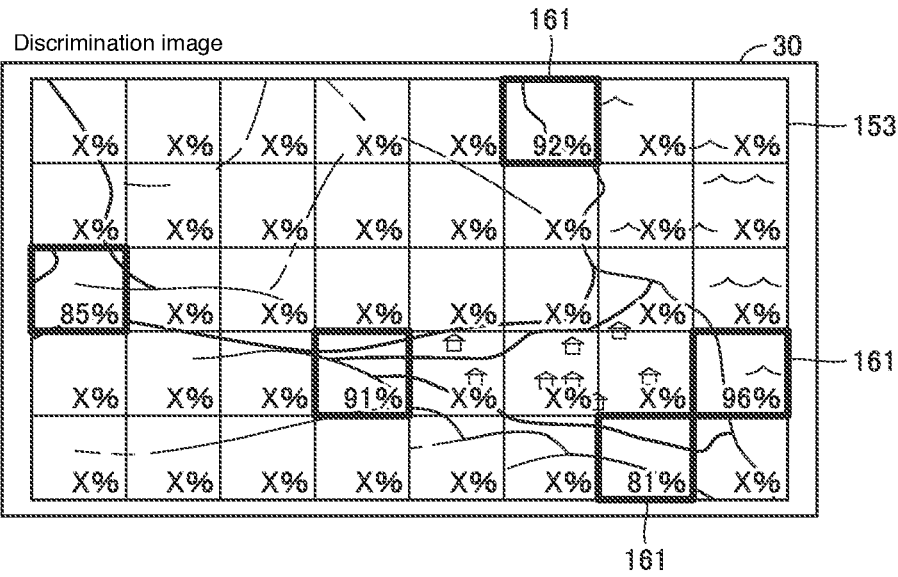
FIG. 7 shows an example of a discrimination image displayed by the target object detection device.

FIG. 4 is a flowchart showing the contents of the target object detecting processing of the target object detection device 1. FIG. 6 is a diagram illustrating an example of an aerial image to be captured by the target object detection device 1. FIG. 7 is a diagram illustrating an example of the discrimination image displayed by the target object detection device 1. Here, the flowchart shown in FIG. 4 will be described with reference to the images shown in FIGS. 6 and 7 as appropriate. The processing based on the flowchart is performed by the controller 40 equipped by the target object detection device 1.

First, the controller 40 acquires the aerial image from the first camera 10 (Step S21). FIG. 6 shows an example of the aerial image 151 captured by the first camera 10. Since the aerial image 151 is an image captured from the sky, the target object, such as, e.g., a victim, is displayed in a small size in the image.

Next, the controller 40 determines whether or not the setting of the number of divisions is set to the automatic setting (Step S22). More specifically, it is determined whether or not the automatic setting flag is stored in the memory 60.

When the setting of the number of divisions is the automatic setting, the controller 40 determines the number of divisions based on the camera-to-object distance H (Step S23). This determination method has already been described with reference to FIG. 5. The controller 40 divides the aerial image based on the determined number of divisions (Step S25).

When the setting of the number of divisions is not the automatic setting, the controller 40 reads the number of divisions from the memory 60 (Step S24). The controller 40 divides the aerial image based on the read number of divisions (Step S25).

Next, controller 40 sequentially determines the divided images based on the estimation model 61 and calculates the confidence score (Step S26). Next, the controller 40 specifies the image whose confidence score is larger than the threshold P among the determined images (Step S27). The threshold P has been stored in the memory 60. Here, it is assumed that the threshold P has been set to 80%, for example.

Next, the controller 40 generates a discrimination image based on the determination result (Step S28). Next, the controller 40 outputs the generated discrimination image to the display device 30 (Step S29). FIG. 7 shows an example of the discrimination image 153.

In FIG. 7, the discrimination image 153 is partitioned into a plurality of images by frames. Each of the images partitioned by the frames corresponds to the image divided by the processing in Step S25. In the discrimination image 153, the confidence score (%) that the target object exists is displayed for each of the images partitioned by the frames. The images with the confidence score exceeding the threshold P (80%) are surrounded by thick frames 161. Therefore, the searcher can easily specify the portions where the confidence score exceeds the threshold P. In FIG. 7, the confidence score of 80% or less is uniformly expressed as X %, but actually, the confidence score corresponding to the portion of the figure is displayed.

The searcher can select the portion of the discrimination image 153 to be checked in more detail by touching the display device 30 with a finger.

Returning to FIG. 4, the explanation of the flowchart will be continued. The controller 40 determines whether an operation of selecting any portion of the discrimination image has been detected (Step S30). When such an operation is detected before the elapse of the standby time T, the controller 40 identifies the position of the ground corresponding to the selected image (Step S31).

The controller 40 outputs a command (Step S32) that specifies the imaging direction and the lens magnification to the second camera 20 which is a long-range (telephoto) camera so that the position corresponding to Step S31 is imaged. The second camera 20 captures a new aerial image in response to this command.

The controller 40 causes the second camera 20 to acquire an aerial image (Step S33). Next, the controller 40 returns to Step S22. Thereafter, the controller 40 repeats the processing relating to the division of an aerial image, the determination of the image, the generation of a discrimination image, and the output of the discrimination image (Step S22 to Step S29). Consequently, in the display device 30, the determination image based on the aerial image captured by the second camera 20 is displayed.

Here, when the aerial image previously captured by the first camera 10 is referred to as a first aerial image, the aerial image captured by the second camera 20 can be referred to as a second aerial image. When the determination image generated based on the first aerial image is referred to as a first determination image, the determination image generated based on the second aerial image can be referred to as a second determination image.

The searcher can also designate the portion to be confirmed by enlarging the portion from the second determination image as required. In this situation, the operation of the searcher is detected in Step S30.

In this manner, the searcher can easily find the target object by checking the first determination image, the second determination image, and the third determination image as required.

When it is determined that an operation of selecting any portion of the discrimination image has not been detected until the standby time T has elapsed (YES in Step S34), the controller 40 determines whether an operation of terminating the processing has been detected (Step S35). When no operation for terminating the processing is detected, the controller 40 returns the processing to Step S21. Thus, the processing based on the aerial image that is newly captured by the first camera 10 is performed.

Therefore, when the target object cannot be found by the aerial image first captured by the first camera 10, the processing of Step S21 to Step S33 based on this flowchart is performed repeatedly on based on a new aerial image re-captured by the first camera 10

Figure 8:
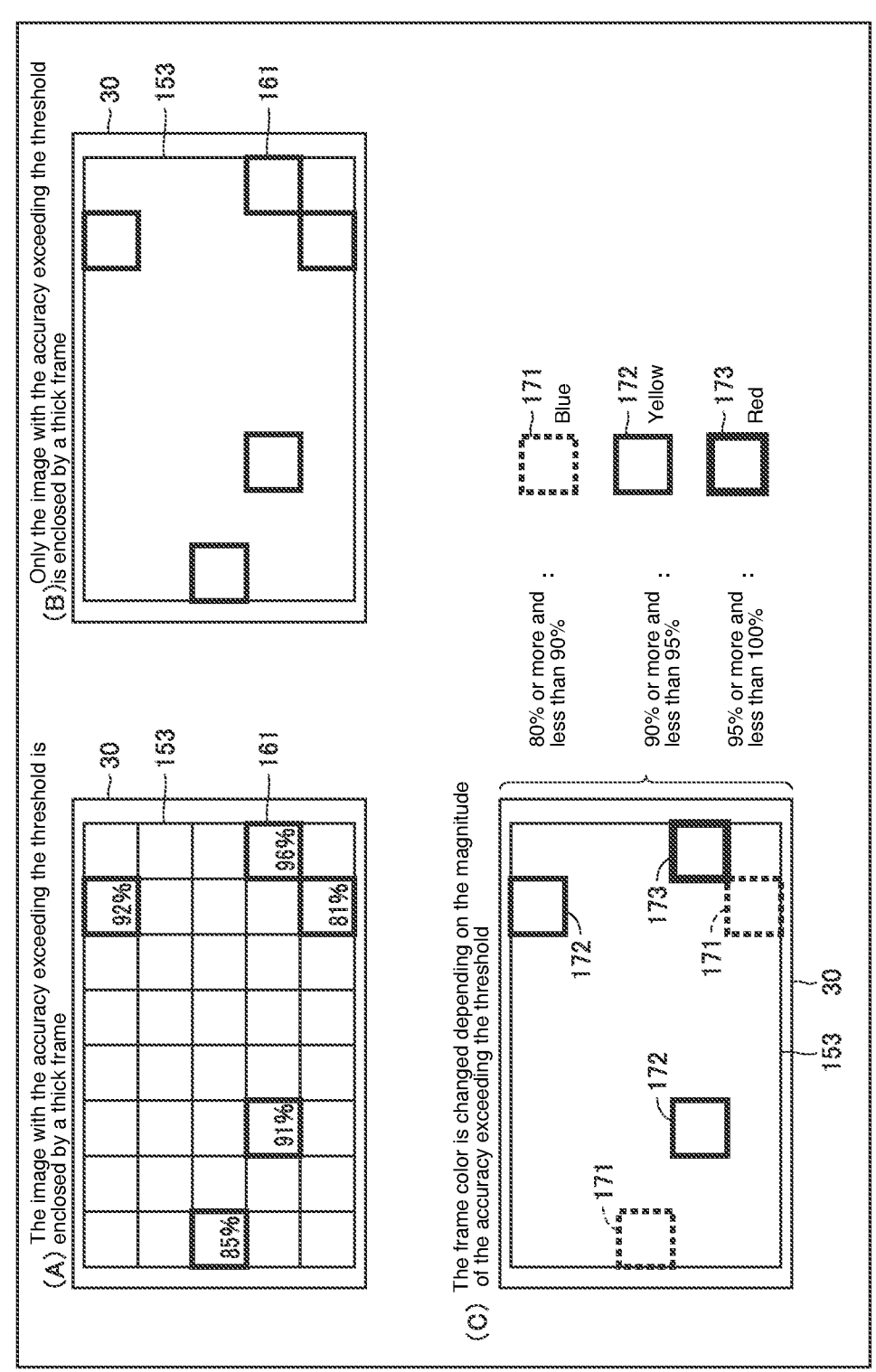
FIG. 8 is diagram showing various examples of the discrimination image.

FIG. 8 is a diagram showing examples of the discrimination image 153. As described above, in the discrimination image 153, images in which the confidence score exceeds the threshold may be surrounded by thick frames 161. At this time, the confidence score may be displayed for only an image whose confidence score exceeds the threshold among the images surrounded by a frame ((A) in FIG. 8). In this way, it is possible to prevent the display of the confidence score from interfering with the visibility of the aerial image.

It may be configured such that only the portion of the image whose confidence score exceeds the threshold is surrounded by a thick frame 161 and that the other images are surrounded by frames ((B) in FIG. 8). At this time, it may be configured such that the accuracy is not displayed on the discrimination image 153.

Depending on the magnitude of the confidence score exceeding the threshold, the frame surrounding the picture corresponding to the confidence score may be colored differently ((c) in FIG. 8). For example, as shown in © in FIG. 8, the blue frame 171 may be used when the threshold is 80% or more to less than 90%, the yellow frame 172 may be used when the threshold is 90% or more to less than 95%, and the red frame 173 may be used when the threshold is 95% or more to less than 100%.

(Modification)

Hereinafter, some modifications of the present embodiment will be described.

In this embodiment, the determination unit 54 uses the estimation model 61 learned by supervised learning to determine the presence of the target object. However, it may be configured such that the target object is specified from the divided images by using a pattern matching technique.

As the first camera 10 and the second camera 20, a thermal camera or the like utilizing infrared rays may be adopted. In the case of using a thermal camera, the temperature can be visualized on the screen. Thus, for example, a victim drifting on the ocean at night can be identified by using the temperature differences between the water temperature and the body temperature. In such a case, an aerial image captured by a thermal camera may be used as training data. In addition, a camera for capturing a still image and a camera using infrared rays may be combined. In this situation, the training data will use an aerial image captured by both the cameras. Further, where there is a location to be imaged in an enlarged manner, it may be imaged by enlarging the location with both the camera for imaging a still image and the camera utilizing infrared rays, or the location may be imaged in an enlarged manner by both the cameras.

When the camera-to-object distance of the aerial image is short, the target object, such as, e.g., a victim, is displayed in an enlarged manner. In this instance, if the number of images to be displayed in a divided manner by the determination image is large, it may be hard to view the image. For this reason, the target object detection device 1 increases the number of divisions of the aerial image when the camera-to-object distance is long and decreases the number of divisions of the aerial image when the camera-to-object distance is short. Further, the display device 30 displays a discrimination image corresponding to the number of divisions on the display device 30. However, it may be conversely configured such that the target object detection device 1 increases the number of divisions of the aerial image target object detection device 1 when the camera-to-object distance is short and decreases the number of divisions of aerial image when the camera-to-object distance is long. When the camera-to-object distance reduces, it approaches the target object. At this time, in order to confirm the location where the target object exists in more detail, it may be useful in some cases to increase the number of divisions.

The controller 40 may display the discrimination image 153 on a head-mounted display mounted on the searcher.

The first camera 10 and the second camera 20 each may be a camera for capturing a moving image. The moving image captured by the first camera 10 or the second camera 20 may be continuously displayed on the display device 30. In this instance, the display device 30 may switch the display of the screen to the discrimination image when a discrimination image is received from the controller 40.

As described above, the target object detection device 1 divides the aerial image into a plurality of images and detects the target object using each of the divided images instead of detecting the target object using the entire aerial image. Further, the target object detection device 1 calculates the confidence score for each of the divided images and displays the discrimination image including the confidence score on the display device 30. Therefore, according to the target object detection device 1, it is possible to provide a useful image for discovering a target object from an aerial image.

Note that it is sufficient for the discrimination image to indicate the degree of the confidence score. For example, as described with reference to FIG. 8, the confidence score may be displayed on the discrimination image, and the information (for example, the thick frame 161, information the blue frame 171, the yellow frame 172, and the red frame 173) capable of discriminating the magnitude of the confidence score may be displayed without displaying the confidence score on the discrimination image.

[Aspects]

It is understood by those skilled in the art that the above embodiment and modification thereof are specific examples of the following aspects.

(Item 1)

A target object detection device according to a first aspect is a target object detection device for detecting at least one target object from an aerial image, comprising:

an imaging device configured to capture a first aerial image;

a computer; and a display device, wherein the computer is configured to divide the first aerial image into a plurality of first images, output a confidence score that the target object is included for each of the plurality of first images, and cause the display device to display a first discrimination image capable of discriminating a degree of the confidence score and a portion of the first aerial image corresponding to the confidence score.

According to the target object detection device as recited in the above-described Item 1, it is possible to provide an image useful to discover a target object from an aerial image.

(Item 2)

In the target object detection device as recited in the above-described Item 1, the first discrimination image includes the plurality of first images and a display of the confidence score corresponding to each of the plurality of first images.

According to the target object detection device as recited in the above-described Item 2, the searcher can confirm the confidence score corresponding to each of the plurality of first images.

(Item 3)

The target object detection device as recited in the above-described Item 1 or 2, wherein the first discrimination image includes an image for highlighting a portion of the first aerial image in which the confidence score exceeds a threshold.

According to the target object detection device as recited in the above-described Item 3, the searcher can easily identify the portion of the first aerial image where the confidence score exceeds the threshold.

(Item 4)

The target object detection device as recited in the above-described Item 3, wherein the computer changes the threshold according to a predetermined operation.

According to the target object detection device as recited in the above-described Item 4, it is possible to display the portion of the first aerial image to be highlighted based on the threshold desired by the searcher.

(Item 5)

In the target object detection device as recited in any one of the above-described Items 1 to 4, when the computer accepts an operation for designating any portion of the first discrimination image, the computer outputs a command to capture an image of a location corresponding to the designated portion to the imaging device.

According to the target object detection device as recited in the above-described Item 5, the searcher can confirm the aerial image corresponding to the location where the target object is considered to exist.

(Item 6)

In the target object detection device as recited in the above-described Item 5, the imaging device includes a first imaging device and a second imaging device capable of imaging a target subject at a higher magnification than the first imaging device, and the computer outputs an imaging command to image a location corresponding to the designated portion to the second imaging device.

According to the target object detection device as recited in the above-described Item 6, it is possible to confirm the detailed aerial image in which the location where the target object is considered to exist is enlarged.

(Item 7)

In the target object detection device as recited in the above-described Item 6, the computer is configured to divide a second aerial image captured according to the imaging command into a plurality of second images, and output a confidence score that the target object is included, for each of the plurality of second images, and cause the display device to display a second discrimination image capable of discriminating the degree of the confidence score and a portion of the second aerial image corresponding to the degree of the confidence score.

According to the target object detection device as recited in the above-described Item 7, it is possible to provide the image useful to discover the target object from the aerial image targeted at locations where the target object is considered to exist.

(Item 8)

In the target object detection device as recited in any one of the above-described Items 1 to 7, the computer accepts an operation to specify the number of divisions when dividing the first aerial image into the plurality of first images.

According to the target object detection device as recited in the above-described Item 8, it is possible to divide the first aerial image based on the number of divisions desired by the searcher.

(Item 9)

In the target object detection device as recited in any one of the above-described Items 1 to 8, the computer outputs the confidence score of including the target object for each of the plurality of first images using a trained model for inferring a presence of the target object for each of the plurality of first images.

According to the target object detection device as recited in the above-described Item 9, the confidence score that the target object is included can be enhanced by using a highly accurate trained model.

(Item 10)

In the target object detection device as recited in claim 9, the trained model has been trained to calculate the confidence score that the target object is included for each divided image based on training data including an image obtained by dividing the aerial image and a result that the target object is present in the divided image.

According to the target object detection device as recited in the above-described Item 10, it is possible to improve the confidence score of determining the presence of the target object based on the divided images.

Although some embodiments of the present invention have been described, the embodiments disclosed herein are to be considered in all respects as illustrative and not restrictive. The scope of the present invention is indicated by claims, and it is intended to include all modifications within the meanings and ranges equivalent to those of the claims.

The invention claimed is:

1. A target object detection device for detecting at least one target object from an aerial image, comprising:

a camera including a lens, the camera configured to capture a first aerial image;

a computer; and a display device, wherein the computer is configured to:

determine a distance between the lens and the ground surface along a center axis of the lens to set a number of divisions, divide an entirety of the first aerial image into a plurality of first images based on the set number of divisions, each of the plurality of first images having a same size, output a confidence score that the target object is included, for each of the plurality of first images, and cause the display device to display a first discrimination image capable of discriminating a degree of the confidence score and a portion of the first aerial image corresponding to the confidence score, wherein the first discrimination image includes the plurality of first images and a display of the confidence score corresponding to each of the plurality of first images, and wherein the computer is configured to output the confidence score that the target object is included, for each of the plurality of first images using a trained model that infers a presence of the target object for each of the plurality of first images.

2. The target object detection device as recited in claim 1, wherein the first discrimination image includes an image for highlighting a portion of the first aerial image in which the confidence score exceeds a threshold.

3. The target object detection device as recited in claim 2, wherein the computer is configured to change the threshold according to a predetermined operation.

4. The target object detection device as recited in claim 1, wherein, when the computer accepts an operation of designating any portion of the first discrimination image, the computer is configured to output a command to capture an image of a location corresponding to the designated portion to the camera.

5. The target object detection device as recited in claim 4, wherein the camera includes a first camera and a second camera, the second camera being capable of imaging a target subject at a higher magnification than the first camera, and wherein when the computer outputs the command, the computer is configured to output an imaging command to image the location corresponding to the designated portion to the second camera.

6. The target object detection device as recited in claim 5, wherein the computer is configured to:

divide a second aerial image captured according to the imaging command into a plurality of second images, output the confidence score that the target object is included, for each of the plurality of second images, and cause the display device to display a second discrimination image capable of discriminating the degree of the confidence score and a portion of the second aerial image corresponding to the degree of the confidence score.

7. The target object detection device as recited in claim 1, wherein the computer is configured to accept an operation to specify the number of divisions when dividing the first aerial image into the plurality of first images.

8. A target object detection device for detecting at least one target object from an aerial image, comprising:

a camera configured to capture a first aerial image;

a computer; and a display device, wherein the computer is configured to:

divide the first aerial image into a plurality of first images, output a confidence score that the target object is included, for each of the plurality of first images, and cause the display device to display a first discrimination image capable of discriminating a degree of the confidence score and a portion of the first aerial image corresponding to the confidence score, wherein a number of divisions of the first aerial image into the plurality of first images is set based on a distance between the camera and the target object, wherein the distance between the camera and the target object is defined as a distance of a center axis of a lens of the camera from the lens to the ground surface, wherein an entirety of the first aerial image is divided into the plurality of first images according to the number of divisions, wherein the first discrimination image includes the plurality of first images and a display of the confidence score corresponding to each of the plurality of first images, and wherein the computer is configured to output the confidence score that the target object is included, for each of the plurality of first images using a trained model that infers a presence of the target object for each of the plurality of first images.

9. The target object detection device as recited in claim 8, wherein the first discrimination image includes an image for highlighting a portion of the first aerial image in which the confidence score exceeds a threshold.

10. The target object detection device as recited in claim 9, wherein the computer is configured to change the threshold according to a predetermined operation.

11. The target object detection device as recited in claim 8, wherein, when the computer accepts an operation of designating any portion of the first discrimination image, the computer is configured to output a command to capture an image of a location corresponding to the designated portion to the camera.

12. The target object detection device as recited in claim 11, wherein the camera includes a first camera and a second camera, the second camera being capable of imaging a target subject at a higher magnification than the first camera, and wherein when the computer outputs the command, the computer is configured to output an imaging command to image the location corresponding to the designated portion to the second camera.

13. The target object detection device as recited in claim 12, wherein the computer is configured to:

divide a second aerial image captured according to the imaging command into a plurality of second images, output the confidence score that the target object is included, for each of the plurality of second images, and cause the display device to display a second discrimination image capable of discriminating the degree of the confidence score and a portion of the second aerial image corresponding to the degree of the confidence score.

14. The target object detection device as recited in claim 8, wherein the computer is configured to accept an operation to specify the number of divisions when dividing the first aerial image into the plurality of first images.

15. The target object detection device as recited in claim 8, wherein the trained model has been trained to calculate the confidence score that the target object is included, for each divided image based on training data including an image obtained by dividing the aerial image and a result that the target object is included in the divided image.

16. The target object detection device as recited in claim 8, wherein the computer is configured to determine the confidence score for each of the plurality of first images by inputting each of the plurality of first images into the trained model including a neural network.

17. The target object detection device as recited in claim 1, wherein the trained model has been trained to calculate the confidence score that the target object is included, for each divided image based on training data including an image obtained by dividing the aerial image and a result that the target object is included in the divided image.

18. The target object detection device as recited in claim 1, wherein the computer is configured to determine the confidence score for each of the plurality of first images by inputting each of the plurality of first images into the trained model including a neural network.

\* \* \* \* \*